Jan. 23, 1968     J. D. OLSZEWSKI ET AL     3,364,863
FUEL INJECTION SYSTEM
Filed May 31, 1966     3 Sheets-Sheet 1

Jan. 23, 1968   J. D. OLSZEWSKI ET AL   3,364,863
FUEL INJECTION SYSTEM
Filed May 31, 1966   3 Sheets-Sheet 2

Jan. 23, 1968    J. D. OLSZEWSKI ET AL    3,364,863
FUEL INJECTION SYSTEM
Filed May 31, 1966    3 Sheets-Sheet 3

3,364,863
FUEL INJECTION SYSTEM
Jerzy D. Olszewski, Engelskirchen-Kaltenbach, Germany (10 Logebachstrasse, 5343 Aegidienberg, Germany), and Wolfgang Köhler, Bad Godesberg, Germany (41 Adelheidisstrasse, 5302 Beuel-Vilich, Germany)
Filed May 31, 1966, Ser. No. 553,828
Claims priority, application Germany, June 3, 1965, K 56,293
12 Claims. (Cl. 103—41)

ABSTRACT OF THE DISCLOSURE

The present invention relates to a fuel injection system, especially for reciprocatory piston internal combustion engines, with one delivery valve in each injection conduit with a device for relieving the pressure in each injection conduit between two consecutive injections.

The fuel injection system according to the present invention is characterized primarily in that each delivery valve has associated therewith a by-pass conduit which is controlled by a relief or reverse flow valve of as low a mass as possible, said reverse flow valve closing toward the injection valve and being urged in closing direction by a spring while the movements of the relief or reverse flow valve are damped. The spring of said relief or reverse flow valve and the working surface thereof are so related to each other or matched that a certain rest or residual pressure adjusts itself in the injection conduit between each two consecutive injections. The fuel injection system according to the invention is furthermore characterized in that the closing body and the set of the relief or the reverse flow valve are so designed that a valve stroke as large as possible is associated with the maximum required flow area.

---

The present invention relates to a fuel injection system, especially for use in reciprocatory piston internal combustion engines, which comprises a delivery valve in each injection conduit and a pressure relief or reverse flow device for relieving the pressure in each injection conduit between two consecutive injections.

Such pressure relief or reverse flow devices are advantageous and are, in most instances, even necessary in order to prevent a faulty closure of the nozzle valve or injection valve and possibly serious disturbances of the nozzle valve closing. These disturbances are caused by the pressure waves occurring in the injection conduit during the after-port opening phase. Instead of a perfect combustion, undesired delays or lag periods occur during the closing of the valve and sometimes even secondary injections. Furthermore, large pressure variations in the injection conduit between consecutive injections will very often cause cavitation erosion in case the pressure drops below atmospheric pressure.

It has already been suggested, in the injection conduit to arrange two valves of the same type and size with conical valve seat, said valves respectively opening in opposite direction. The valve opening in the direction towards the injection valve operates as delivery valve, while the other valve acts as reverse flow or pressure relief valve. This arrangement has the disadvantage that its diameter becomes relatively large because the load springs are arranged within the valves and already for this reason, the said valves have to have a great diameter. Furthermore, these valves open in an undamped manner so that the reverse flow valve will jump and flutter in view of the reversed pressure waves. This undesired behavior of the valve is still worsened due to the fact that a large surface, which depends on the diameter of the valve guiding piston, is presented to the fuel following the opening of the valves, and in view of the fact that smaller discharging cross sections are provided behind the flow area of the reverse flow valve. A so-called pressure step occurs, i.e., the valves open up completely and in a shock-like manner immediately following the opening of the flow area.

A still further arrangement has become known in which the pressure relief or reverse flow valve is arranged within the delivery valve. Also in this instance, no damping of the reverse flow valve has been provided for, and during the opening of the valve, a large pressure step (ratio of opening pressure to closing pressure) will occur. Experience has shown that this reverse flow or pressure relief arrangement does not operate satisfactorily. Thus, for instance, it is impossible to maintain a constant rest or residual pressure between consecutive injections under all operating conditions. The reverse flow valve will temporarily release an excessive quantity of fuel in view of an occurring over-oscillation, i.e., the pressure will be relieved to a valve below the desired rest or residual pressure. It has been suggested to dispose a throttle in the injection conduit in front of the above-mentioned arrangement, however, the arrangement is such that it is effective also during the injection. With this in mind, it will be clear that it cannot have such small dimensions as would be required for obtaining a noticeable damping effect during the relief operation.

Another arrangement has become known in which the delivery valve consists of a plate loosely resting on the reverse flow or relief valve which is subjected to the force of a strong spring. The plate is lifted off its support during the pressure stroke of the pump and therefore frees the passage to the injection valve for the fuel flowing in through a central bore in the relief valve. During the after-port opening, the relief valve resting flat on a seat of larger diameter is opened up through the intervention of this loose plate. The operation of this arrangement is not satisfactory since the movement of the relief valve is not damped and since, in addition thereto, a large pressure step or ratio of the valve opening pressure to the valve closing pressure prevails. A fundamental disadvantage of this arrangement consists in that the pressure relief valve frees a larger cross section or flow area per stroke than the delivery valve and, furthermore, in that a very strong load spring of large dimensions is required for the relief valve.

It is, therefore, an object of the present invention to provide a fuel injection system, especially for reciprocatory piston internal combustion engines, comprising a delivery valve and a reverse flow or pressure relief device, which will overcome the drawbacks of the heretofore known fuel injection systems.

It is, furthermore, an object of the present invention to provide a fuel injection system with a pressure relief or reverse flow device which will assure a constant rest or residual pressure between consecutive injections independently of the speed and load, in order to prevent the serious disturbances mentioned above and occurring in the heretofore known fuel injection systems.

These and other objects and advantages of the invention will appear more clearly from the following specification in connection with the accompanying drawings in which.

Figure 1:
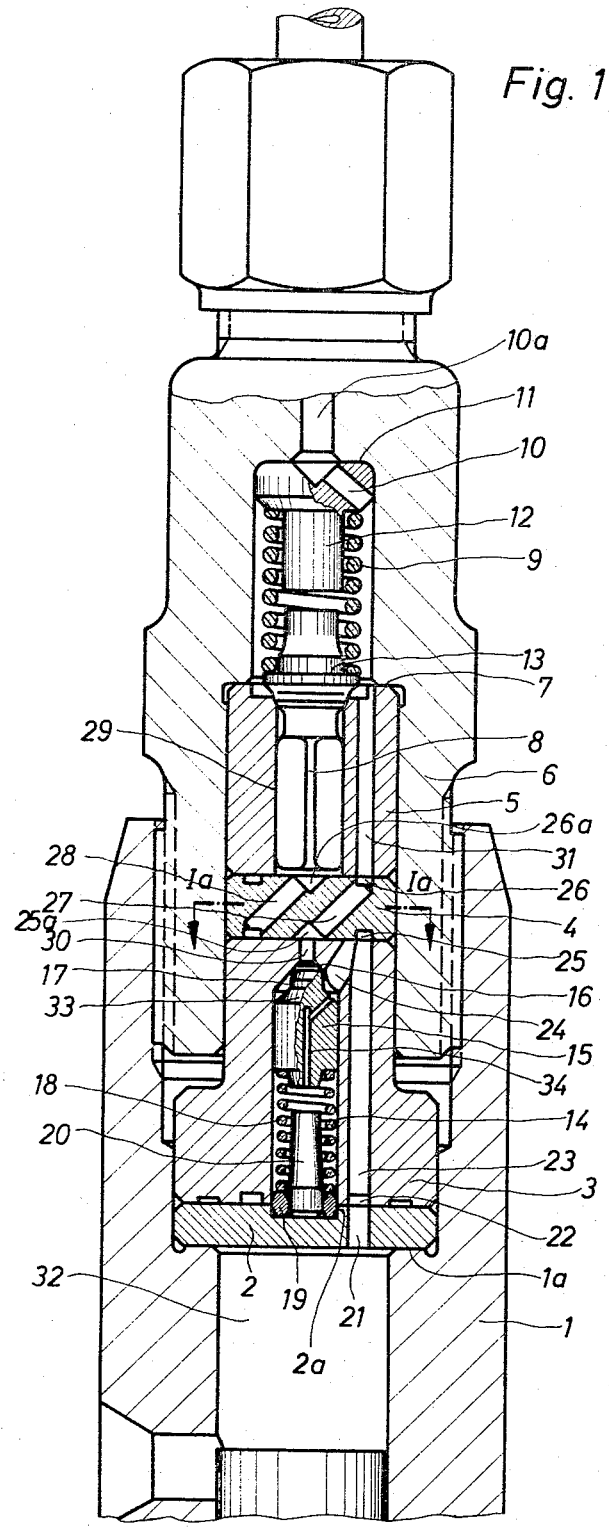
FIGURE 1 is a cross section through a fuel injection system with a delivery valve and pressure relief or reverse flow valve, arranged one behind the other and in axial alignment with each other.
Figure 1A:
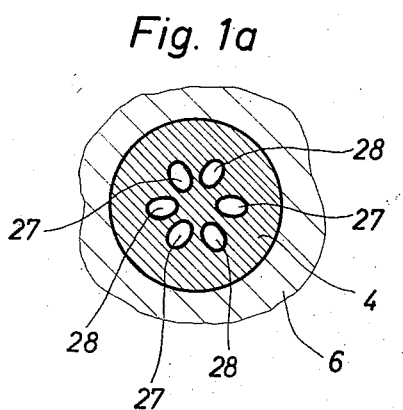
FIGURE 1a is a section along the line Ia—Ia of FIGURE 1.

The fuel injection system according to the present invention is characterized primarily in that each delivery valve has associated therewith a by-pass conduit which is controlled by a relief or reverse flow valve of low mass, closing towards the injection valve and urged by a spring in closing direction while the movements of the relief valve are damped. The spring of this relief or reverse flow valve and its working surface are so related to each other or matched that a certain rest or residual pressure adjusts itself in the injection conduit between each two consecutive injections. Furthermore, the closing body of the relief or reverse flow valve and the seat thereof are so designed that a valve stroke as large as possible is associated with the maximum required flow area.

The advantageous effect of the arrangement according to the present invention consists in that the relief or reverse flow valve brings about such a fast steady and intensive reduction of the positive pressure waves returning to the injection pump during the after-port phase in view of the great sensitivity of the valve because of its low mass and in view of its high natural frequency and very effective lag or deceleration to which it will be subjected during the opening in view of the association of a large stroke to the maximum required flow area or cross section, that the pressure between two consecutive injections will not drop below the adjustable rest or residual pressure.

In order, under all circumstances, to prevent an undesired so-called pressure step (the ratio of the valve opening pressure to the valve closing pressure) at the reverse flow valve and thereby an interruption of the steadiness during the opening operation, it is recommended in conformity with a further development of the present invention to provide as large as possible a ratio of the working surface of the reverse flow valve to the surface presented to the fuel during the opening of the valve behind the flow cross section or area of the valve, and to take care that the cross sectional area behind the flow area is a multiple of the latter. It is furthermore suggested to arrange a throttling passage in the by-pass to the delivery valve on the side of the injection valve in front of the reverse flow valve, in order to weaken the shock waves returning to the injection pump.

The damping of the reverse flow valve is advantageously effected hydraulically, for instance by designing the reverse flow valve in a manner known per se as piston valve and by letting the guiding piston of the piston valve move into a liquid filled chamber which is closed with the exception of a throttling passage extending through the piston in longitudinal direction of the valve, or with the exception of a throttling passage surrounding the piston. The throttling passage may be provided by a corresponding selection of the play of the piston or by cutouts in the circumferential surface of the piston and extending in longitudinal direction of the latter.

The arrangement of the delivery valve, reverse flow valve and of the by-pass relative to the delivery valve may take various forms. Very favorable is an arrangement in which the delivery valve and the reverse flow valve are disposed one behind the other and in axial alignment with regard to each other so that a very small diameter will be obtained. It is furthermore advantageous to arrange the reverse flow valve within the delivery valve and to combine both valves in one single unit which can easily be exchanged. This last mentioned design is particularly suitable for subsequently providing already existing fuel injection pumps with relief or reverse flow devices according to the present invention. Finally, within the purview of the present invention it is suggested to limit the stroke of the reverse flow valve, as is customary with delivery valves.

Referring now to the drawing in detail, and FIG. 1 thereof in particular, the fuel injection pump illustrated therein comprises a plunger and barrel assembly with a barrel 1 having inserted therein a pressure plate 2 resting on a shoulder 1a of barrel 1. Barrel 1 has furthermore inserted therein a reverse flow or relief valve housing 3, a deviating plate 4 and a delivery valve housing 5. Elements 1 to 5 are sealingly held together by a delivery valve holder 6 which simultaneously serves for connection with an injection conduit (not shown) leading to an injection nozzle. Delivery valve holder 6 rests with an inner shoulder 7 on delivery valve housing 5. A valve member 8 of the delivery valve is subjected to the force of a closing spring 9 which rests on one hand against a stroke limiting abutment 12 provided with passages 10 and resting against an inner shoulder 11 of holder 6, and on the other hand rests against the end face 13 of valve member 8.

In a central bore 14 of relief or reverse flow valve housing 3 there is arranged a valve needle 15 which at one end thereof tapers to the diameter of a valve seat 16 in such a way that it forms together with the housing 3 an annular passage 17. The other end of valve needle 15 is subjected to the force of a spring 18 resting on a spacer ring 19. The lower portion of this ring extends into a cylindrical recess 2a of pressure plate 2 while the upper portion of this ring extends into the central bore 14 and serves for centering pressure plate 2 and reverse flow valve housing 3 with regard to each other.

Spacer ring 19 has inserted therein a valve abutment 20 resting against pressure plate 2. Pressure plate 2 is provided with a plurality of bores 21 (only one being shown in FIG. 1) communicating with an annular groove 22 of housing 3 which in turn is provided with passages 23 which start from annular groove 22 and which communicate with annular passage 17 through bores 24 extending at an angle with regard to the longitudinal axis of housing 3.

Deviating plate 4 has its end faces respectively provided with annular grooves 25, 26 and central countersinks 25a, 26a. Symmetrical and parallel passages 27, 28 extend from the respective annular groove 25, 26 to the counter-sink 25a, 26a of the respective opposite end face. In this way, the longitudinal bores 23 of relief valve housing 3, are via annular groove 25 and passages 28, in communication with the guiding bore 29 of delivery valve member 8. On the other hand, a throttling passage 30 arranged in front of relief valve needle 15 communicates through annular groove 26 and passages 27 with the bores 31 provided in the housing 5 of the delivery valve, said bores 31 establishing a communication with the connection to the injection conduit.

During the pressure stroke of the plunger of the fuel injection pump (not shown) the fuel is fed from pump chamber 32 through bores 21 and annular groove 22 into the passages 23. From there the fuel passes through annular groove 25 into the bores 28 and opens up the delivery valve part of which in turn frees the passage to the injection conduit. During the delivery operation also the annular surface 33 of valve needle 15 is subjected to the pressure of the fuel through the intervention of passages 24. Consequently, also the relief or reverse flow valve permits the passage of fuel into the injection conduit through throttling passage 30, passages 27, annular groove 26 and bores 31. This, however, does not affect the after-port opening phase of the relief valve, which phase starts following the completion of the delivery of the fuel in view of the collapse of the pressure in chamber 32. During this phase passages 21, 22, 23, 25 and 28 are relieved and the member 8 of the delivery valve 5 closes.

Independently of the above described operation, the shock wave caused by the rebound of the fuel at the injection nozzle is, through the passages 31, 26 and 27 and already damped by the throttling passage 30, being reduced in the flow area of the relief valve 3, 15 while it controls the stroke of the valve in conformity with the transported amount of fuel. This movement of the valve is effected in a hydraulically damped manner since the amount of fuel displaced by needle 15 in bore 14 behind the needle has to escape through a throttling passage 34 extending through the needle. Upon passing through valve 3 via throttle 30 and passage 17, the fuel flows off through passages 24, 23, 22 and 21. Then valve needle 15 closes as soon as the pressure in the conduit has dropped below the closing pressure of the valve. The conduit remains under this pressure until the next injection is effected.

Figure 2:
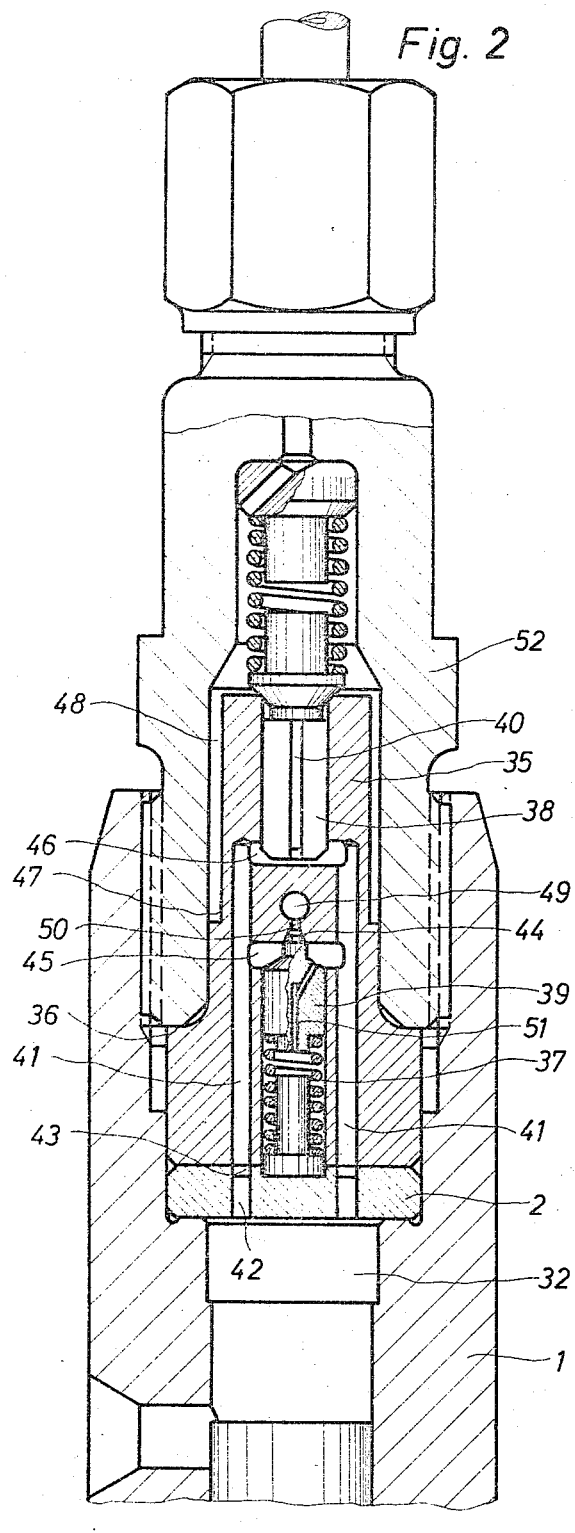
FIGURE 2 shows a fuel injection system slightly modified over that of FIG. 1.

With the embodiment according to FIG. 2, the reverse flow valve housing, the deviating plate and the delivery valve housing of the embodiment of FIG. 1 have been combined to a unit 35 provided with a shoulder 36 against which rests the end face of a delivery valve holder 52 which latter presses unit 35 sealingly onto pressure plate 2. Unit 35 comprises central guiding bores 37 and 38 starting from the respective end face of unit 35. Guiding bore 37 receives the valve needle 39 of the reverse flow valve, whereas guiding bore 38 receives a member 40 of the delivery valve.

Unit 35 has arranged therein a plurality of longitudinal bores 41, which communicate through passages 42 and an annular groove 43 in pressure plate 2 with the chamber 32 of the fuel injection pump. Unit 35 is furthermore provided with an annular recess 45 arranged immediately behind valve seat 44 of the reverse flow valve, and an annular recess 46, both recesses communicating with the longitudinal bores 41. An annular gap 48 between unit 35 and holder 52 is formed by the provision of a collar 47. A transverse bore 49 leads into gap 48 and communicates with a throttle 50 arranged in front of valve seat 44.

The fuel passes in the direction of delivery through the passages 42, 43, 41, 46, and 38 into the injection conduit. The pressure in this conduit is relieved via the annular chamber 48, the transverse bore 49, throttle 50 and through the flow area of the valve through recess 45 into the passages 41, 43, and 42 back into chamber 32. As was the case with the embodiment of FIG. 1, valve needle 39 is passed through by a damping and throttling passage designated with the reference numeral 51.

Figure 3:
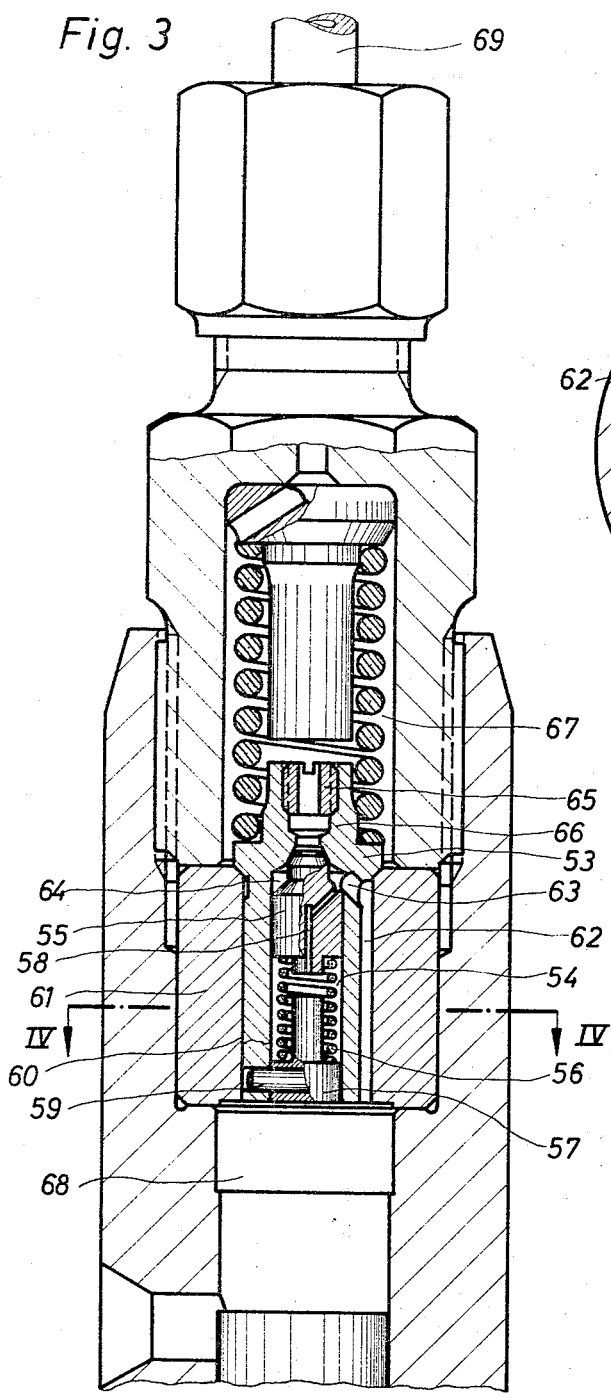
FIGURE 3 is a cross section through a fuel injection system in which the pressure relief valve is arranged within the delivery valve.
Figure 4:
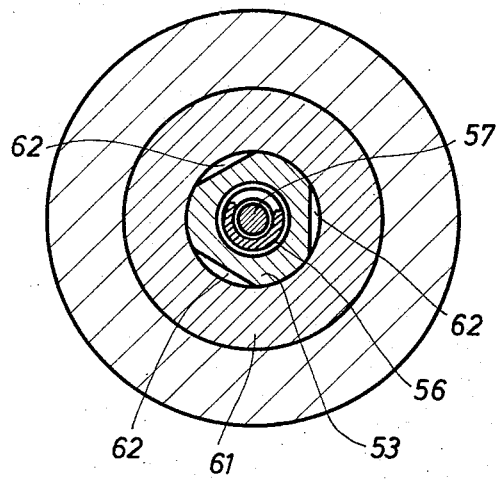
FIGURE 4 is a section along the line IV—IV of FIGURE 3.

With the arrangement according to FIG. 3, a valve member 53 of the delivery valve proper is employed as housing for the relief or reverse flow valve. Member 53 has provided therein a guiding bore 54 and a valve needle 55 of the reverse flow valve, the closing spring 56 of which rests at that end thereof which is remote from needle 55 against a spring dish 57 which simultaneously serves as abutment means for limiting the stroke of the needle. Spring dish 57 is inserted into the guiding bore 54 with a forced or high class fit and is held therein by a pin 59 inserted in corresponding bores of member 53 and spring dish 57 in a direction perpendicular to the longitudinal axis of the valve.

A plurality of recesses have been cut or ground into the circumference of the guiding shank 60 of member 53 so that they form together with valve seat body 61 a plurality of passages 62 of circular cross section. One bore 63 each extends into these passages 62 at an angle with regard to the longitudinal axis of member 53. These bores 63 connect passages 62 with a chamber 64. A throttle 65 is screwed into an extension 66 of valve member 53.

During the delivery phase of the pump, valve member 53 is lifted in view of the pressure of the fuel, and the fuel passes through passages 62 and through the flow cross section of the valve into the spring chamber 67 and from here into the injection conduit 69. During the relief or reverse flow phase, the fuel flows through throttle 65 and through the flow area or cross section of the relief or reverse flow valve into chamber 64 and from there through bores 63 and passages 62 into chamber 68 of the pump. Also in this instance, the damping of the movement of the valve needle is determined by the resistance to flow of throttling passage 58 in needle 55 since the chamber of spring 56 in view of the forced fit between spring dish 57 and valve member 53 is completely closed for all practical purposes.

Tests have shown that the rest or residual pressure adjusted in the injection conduit remains constant during all operating conditions of the motor in which the fuel injection system according to the present invention has been employed, i.e., the rest or residual pressure remains constant independently of the length and cross section of the conduit and independently of the cross section and opening pressure of the injection nozzle. Pressures below atmospheric pressure have been completely eliminated and thereby the danger of cavitation erosion in the injection conduit. Furthermore, unstable conditions in the course of the fuel injection, as they exist in the heretofore known fuel injection systems have been eliminated.

The arrangement according to the present invention makes it possible to reduce the opening pressures of the injection valves considerably and makes it also possible to employ, if necessary, longer injection conduits while nevertheless preventing secondary injections, pressures below atmospheric pressure in the injection conduit and unstable conditions. Thus, for instance, a test carried out with a fuel injection system according to the present invention with a 6 meter long injection conduit instead of the normally employed injection conduit of a length of 1.7 meters and with an opening pressure reduced to 200 atmospheres instead of the normally employed 350 atmospheres, resulted in a satisfactory course of the injection without secondary injections with an injection quantity of 720 cubic millimeters per stroke and with a speed of 375 r.p.m.

Figure 5:
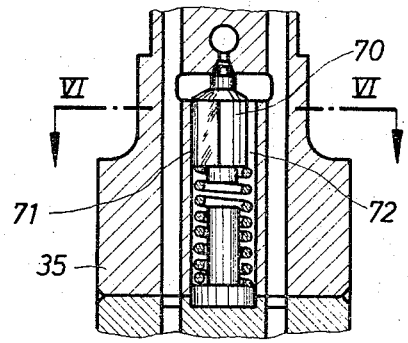
FIGURE 5 is a further modification of the fuel injection system according to the invention.
Figure 6:
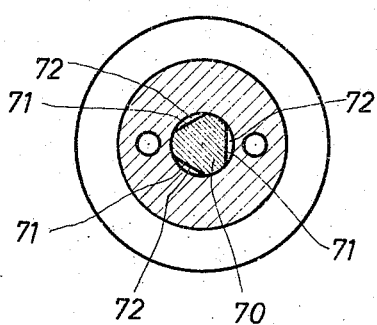
FIGURE 6 is a section along the line VI—VI of FIGURE 5.

FIGURE 5 shows a modified fuel injector system which differs from the system of FIGURES 1–4 in that it is provided with throttling passages 72 formed on one hand by the valved piston guiding bore in housing 35 and on the other hand by the plane surfaces 71 of the guiding piston 70 of the relief valve (see also, FIGURE 6), said plane surfaces being formed by cutouts in the circumferential surface of the piston and extending in the longitudinal direction of the latter.

It is, of course, to be understood that the present invention is, by no means, limited to the particular constructions shown in the drawing but also comprises any modifications within the scope of the appended claims.

What is claimed is:

1. In a fuel injection system having a pump and fuel injector means supplied by the pump and a conduit connecting the pump with the injector means; a device in said conduit for relieving the pressure in said conduit between each two consecutive fuel injections, said device comprising a first valve opening toward the injection means in response to a supply of fuel under pressure from said pump and closing when the pump pressure terminates, a bypass channel bypassing said first valve for the return of fuel from the conduit leading to the injection means to the pump, a relief valve in said bypass channel having a valve member normally preventing flow in the bypass channel away from said pump and responsive to a predetermined pressure in the bypass channel on the injector means side of the relief valve to open and permit fuel flow toward said pump, a spring urging said relief valve member toward closed position, said relief valve member being small in mass and having a relatively small area acted on by the fuel in said bypass channel, said bypass channel having a restricted region therein immediately preceding said small area, said small area being in the form of the end surface of a reduced size projection on the end of said valve member which engages one end of said restricted region, said bypass channel widening gradually from the said one end of said restricted region toward said pump whereby a substantial stroke of the valve member is necessary to provide maximum communication of said restricted region with the portion of the bypass channel leading therefrom to said pump, and damping means damping the movement of said valve member at least in the opening direction.

2. A fuel injection system according to claim 1 in which the cross sectional area of said valve member and of said portion of said bypass channel is a multiple of the said small area.

3. A fuel injection system according to claim 2 in which flow throttling means is disposed in said bypass channel ahead of said valve member.

4. A fuel injection system according to claim 2 in which said damping means comprises hydraulic damping means.

5. A fuel injection system according to claim 2 in which said damping means comprises a closed fluid filled chamber in which said valve member is reciprocable, and a throttling passage leading from said chamber to said pump control the displacement of fluid from said chamber of the valve member when the latter moves in opening direction.

6. A fuel injection system according to claim 5 in which said throttling passage is in the valve member.

7. A fuel injection system according to claim 5 in which said throttling passage is the clearance gap surrounding the valve member.

8. A fuel injection system according to claim 7 which includes annular recesses in the surface of said valve member.

9. A fuel injection system according to claim 1 in which said relief valve and said first valve are in axial alignment with each other.

10. A fuel injection system according to claim 8 in which said valves and the means defining said bypass channel form a single structure unit.

11. A fuel injection system according to claim 10 in which said unit is provided with means for the direct mounting thereof on said pump.

12. A fuel injection system according to claim 1 which includes means for limiting the maximum travel of said valve member in the opening direction.

References Cited
UNITED STATES PATENTS

| | | | |
|---|---|---|---|
| 2,729,169 | 1/1956 | Nichols | 103—41 |
| 2,740,667 | 4/1956 | Dickson et al. | 103—41 X |
| 2,777,434 | 1/1957 | Aldinger | 103—2 X |
| 2,796,769 | 6/1957 | Gratzmuller | 103—41 X |
| 2,797,644 | 7/1957 | Hogeman | 103—41 |
| 2,888,876 | 6/1959 | Nichols | 103—41 |
| 3,075,707 | 1/1963 | Rademaker | 103—41 X |
| 3,115,304 | 12/1963 | Humphries | 103—41 X |

ROBERT A. O'LEARY, *Primary Examiner.*

DONLEY J. STOCKING, *Examiner.*

W. J. KRAUSS, *Assistant Examiner.*